United States Patent
Frampton et al.

(10) Patent No.: US 6,988,509 B2
(45) Date of Patent: Jan. 24, 2006

(54) RISER LINE SHUTOFF VALVE

(75) Inventors: Robert Frampton, Orchard Park, NY (US); William Siska, Elm, NY (US); Glenn Maslowsky, Westfalls, NY (US)

(73) Assignee: Carleton Technologies, Inc., Orchard Park, NY (US)

( * ) Notice: Subject to any disclaimer, the term of this patent is extended or adjusted under 35 U.S.C. 154(b) by 120 days.

(21) Appl. No.: 10/390,302

(22) Filed: Mar. 17, 2003

(65) Prior Publication Data

US 2004/0182442 A1    Sep. 23, 2004

(51) Int. Cl.
*F16K 17/30* (2006.01)
(52) U.S. Cl. .................. 137/460; 137/498; 137/508
(58) Field of Classification Search ............ 137/460 I, 137/498, 503, 504, 508
See application file for complete search history.

(56) References Cited

U.S. PATENT DOCUMENTS

| 2,763,286 | A | * | 9/1956 | Wilson ................. 137/486 |
| 3,375,839 | A | | 4/1968 | Crenshaw |
| 3,981,300 | A | | 9/1976 | Williams ............. 128/142 R |
| 3,981,302 | A | | 9/1976 | Veit |
| 4,347,867 | A | * | 9/1982 | Peters ................. 137/460 |
| 4,432,514 | A | | 2/1984 | Brandon ............. 224/118.5 |
| 4,619,255 | A | | 10/1986 | Spinosa et al. |
| 4,651,728 | A | | 3/1987 | Gupta et al. |
| 4,651,729 | A | | 3/1987 | Rae |
| 4,799,476 | A | | 1/1989 | McGrady |
| 4,924,901 | A | | 5/1990 | Valavaara ............. 137/102 |
| 5,107,649 | A | * | 4/1992 | Benson et al. ............. 60/481 |
| 5,357,949 | A | | 10/1994 | Bertheau et al. ....... 128/204.29 |
| 5,809,999 | A | | 9/1998 | Lang |
| 6,213,144 | B1 | | 4/2001 | Moore ................. 137/219 |
| 6,244,540 | B1 | | 6/2001 | Stabile et al. ............. 244/118.5 |
| 6,443,180 | B1 | | 9/2002 | Samuelson et al. |

FOREIGN PATENT DOCUMENTS

| DE | 388716 | 11/1915 |
| EP | 0039643 | 11/1981 |
| GB | 940749 | 10/1963 |

* cited by examiner

*Primary Examiner*—Stephen M. Hepperle
(74) *Attorney, Agent, or Firm*—Jaeckle Fleischmann & Mugel, LLP

(57) ABSTRACT

The riser line shutoff valve where oxygen flows into the valve from the inlet and through an orifice in the piston. This orifice creates differential pressure between the upstream and downstream side of the piston. When the differential pressure across the piston exceeds the spring load and friction between the piston and the valve body, the piston moves to the left and seats on the brass probe in the conical area of the piston, preventing the flow of oxygen. The valve will not open until the upstream pressure is removed. The base of the brass probe has holes, allowing oxygen to flow out of the outlet port when the valve is open. The probe is threaded into the probe base allowing for valve adjustment for proper operation. The spring simultaneously serves the functions of retaining the probe base and providing a piston load to keep the piston open until the critical flow rate is reached.

10 Claims, 1 Drawing Sheet

RISER LINE SHUTOFF VALVE

DESCRIPTION OF TECHNICAL FIELD

This present invention relates to a riser line shutoff valve. More particularly to a riser line shutoff valve installed in an aircraft, designed to prevent the flow of oxygen in the event that a riser line is severed during flight, and provide a constant flow of oxygen in non-compromised lines from altitudes between sea level and 40,000 ft.

BACKGROUND

It is well known that the partial pressure of oxygen in the atmosphere decreases with altitude. For this reason it is necessary to provide the pilot and crew of high altitude aircraft with breathing systems in order to prevent hypoxia at high altitudes. Some of the breathing systems involve the use of auxiliary oxygen systems onboard the aircraft. At certain altitudes, the cabin pressurization system may malfunction leading to cabin depressurization. In the event of this occurrence, aircraft flying at high altitudes require auxiliary oxygen systems to provide oxygen to passengers and crew. In these auxiliary oxygen systems, oxygen is provided to the pilot and crew by oxygen masks worn on their faces that are supplied from an oxygen source through a pressure step-down regulator. The auxiliary oxygen supply system typically has multiple flowlines, some of which pass through areas of the aircraft fuselage that are at higher risk of damage due to engine failure (which might send broken pieces through said supply lines). It is important to have a mechanism that will automatically stop oxygen flow in such cases in order to avoid wasting the oxygen supply and feeding potential fires, to continue flow to operating lines and to avoid potential $O_2$ buildup in pre-compromised areas of the craft.

Such a system comprised of an oxygen source, a central-oxygen pressure step-down regulator, a flow control means, and an emergency shut-off mechanism attached in a low-risk area of the craft to each of a multiple of oxygen distribution lines. In these breathing systems it is possible that a riser line carrying oxygen may become severed during flight. It is desirable that the flow of oxygen cease flowing through the compromised line, while oxygen continues to flow at a specified rate through the non-compromised line. It is also desirable that the pressure based on the altitude of the aircraft.

Most or all of the oxygen systems used presently on operational aircraft lack a mechanism to disable the flow of oxygen to the masks in the event that an oxygen line becomes severed. The systems known in the art generally comprise a plurality of oxygen generators, or tanks, a regulator to control the flow of oxygen and means for connecting to a mask. If an oxygen line is severed, oxygen will continue to flow through that line, never reaching the masks. This leads to the excessive depletion of stored oxygen supplies, which is both wasteful and unsafe. While breathing systems are known to employ valves that regulate flow based on altitude, these valves will not shut off when a line is severed. While the prior art oxygen systems themselves are adequate, the problem can be corrected by technological advances in the valve technology that is used in conjunction with these systems.

Prior art valves, such as simple ball and check valves, have a number of problems associated with them when utilized in auxiliary oxygen systems. The valves only operate between extremes and are either completely open to allow full flow, or completely closed to prohibit flow. These valves have no provisions to accommodate the varying functions of the flow regulator. Other prior art valves, are simply flow control devices, and do an adequate job of regulating flow, however they can not serve as shut-off valves should an emergency condition arise, such as the severing of an oxygen line. Furthermore, prior art shut off valves react instantaneously to changes of pressure, closing the valve as a result of transient pressure variations.

Additionally, prior art shut off valves are highly erratic and tend to inadvertently close during normal operation. It is also desirable for this valve to have a time delay.

SUMMARY OF THE INVENTION

The present invention provides a single apparatus that will prevent excessive oxygen loss in the event that a supply line feeding the cabin masks is severed, and provide a continuous flow of oxygen through any line that has not been compromised. The device contains a pneumatic time delay that will preclude the valve from reacting to transient variations in air pressure. The invention will operate according to the method described in two distinct failure modes as presented below.

The first failure mode occurs during flight, when the oxygen system is idle and supply lines are at ambient conditions. An incident then occurs, resulting in a compromise to the riser line and the activation of the auxiliary oxygen system. The flow control unit will begin to purge the system. Following the initial surge, the riser line shutoff valve in the compromised line is closed and flow in the line will diminish to ambient. The non-compromised lines remain open and flow to the masks. Subsequent to the purge, the masks will deploy and the valve in the non-compromised lines will flow to the masks. As the initial surge pressure bleeds down, the riser line valve remains open and allows for the flow of oxygen for the duration of the flight.

The second failure mode occurs during flight, when an incident causes the cabin to depressurize and does not compromise a riser line. In this situation the oxygen system is activated and the riser line shutoff valve is exposed to the same conditions as stated in the above scenario. All of the valves will remain open and flowing throughout the flight.

The shut-off function of the riser line valve is dependant on differential pressure between the inlet and the outlet, and could vary based on friction and internal spring rate tolerances. Additionally, the riser line valve is capable of continuously allowing a maximum flow rate of 56 lpm at 15,000 ft. or 264 lpm at 40,000 ft. without closure. In the event of a severed line, the riser line valve will close, with a minimal loss of oxygen.

BRIEF DESCRIPTION OF THE DRAWINGS

The above-mentioned and other features and advantages of this invention, and the manner of attaining them, will become appreciated and be more readily understood by reference to the following detailed description of one embodiment of the invention in conjunction with the accompanying drawings, wherein.

DETAILED DESCRIPTION OF THE DRAWINGS

Figure 1:
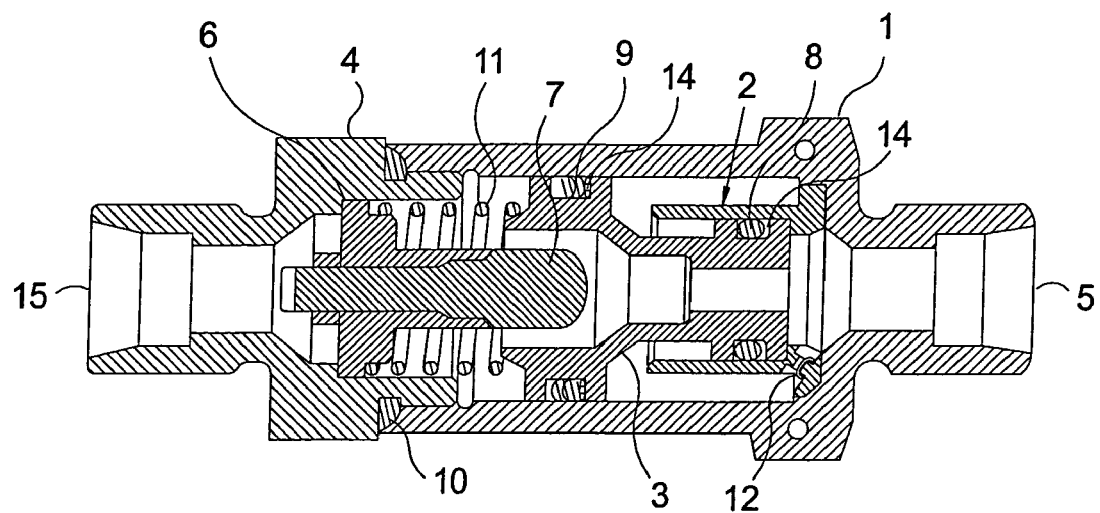
FIG. 1 is the riser line shutoff valve.

The riser line shutoff valve of the present invention is shown in FIG. 1. Oxygen flows into the valve from the inlet 5 and through an orifice in the piston 3. This orifice creates differential pressure between the upstream and downstream side of the piston. When the differential pressure across the piston exceeds the spring 11 load, the piston moves to the left and seats on the probe 7, in the conical area of the piston, preventing the flow of oxygen. Once the valve is closed in this manner, it will not open until the upstream pressure is removed. The base 6 of the probe 7 has holes, allowing oxygen to flow out of the outlet port 15 when the valve is open. The probe 7 is threaded into the probe base 6 allowing for valve adjustment for proper operation. The probe base 6 is located in the left body part 4 and retained in place by spring 11. The spring 11 simultaneously serves 2 functions, retaining the probe base 6 and providing a piston load to keep the piston open until the critical flow rate is reached.

Prior art valves are deficient in that they may close inadvertently during normal operation. This condition occurs when the oxygen system is first pressurized. When the downstream volume is at ambient pressure and the valve upstream pressure is raised rapidly, the flow rate through the valve is several times the critical flow. This causes the valve to close and remain closed even though the downstream lines are not broken, cutting off the oxygen supply to the passengers sitting in the effected area. The current invention prevents this by arranging an upstream orifice in front of the valve to limit flow rate below the critical level.

Figure 2:
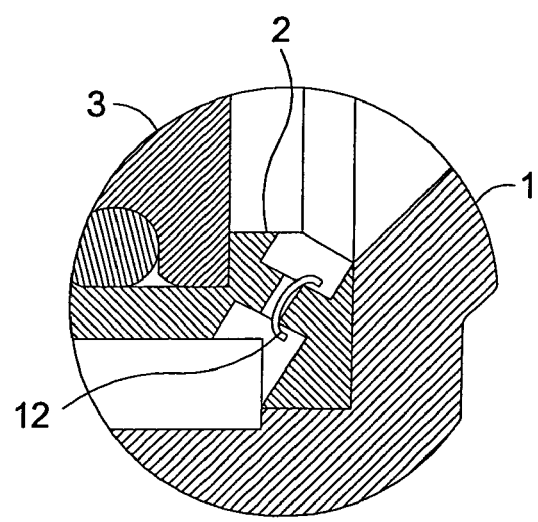
FIG. 2 is a detailed view of the orifice with the piston guide and wire.

The current invention avoids this problem by instituting a time delay, preventing the valve from closing for a few seconds and allowing the downstream volume to reach pressure and reduce flow rate to a point below the critical level. FIG. 2 is a detailed view of how this is accomplished. This time delay reduces the upstream pressure area of the piston so that insufficient force is generated to overcome the spring load. This time delay is implemented by means of a small orifice in the piston guide 2 leading to a cavity formed between the valve body 1, the piston guide 2 , and the piston itself. This small orifice prevents the pressure from rising rapidly in the cavity so that the effective upstream pressure area of the piston is reduced. The pressure upstream of the piston and inside the guide diameter is at supply pressure. The pressure down stream of the piston is lower thus creating a differential force. The net force across the piston is too low to overcome the spring 11 because the upstream face of the piston, outside the guide (inside the cavity) is delayed from reaching the supply pressure level. Eventually, in a steady state, the cavity pressure reaches the supply pressure level and thereafter the valve performs normally as the piston upstream and downstream pressure areas are equalized in one embodiment. The cost of the valve is reduced by drilling a larger than required orifice into the cavity and then reducing the orifice size by inserting a fine wire 12 into the hole. This wire 12 serves to restrict flow while preventing the small orifice from becoming clogged by contamination. This is accomplished because the wire continually moves in the flow stream, dislodging any contamination that reaches the orifice. Item 10 is a static O-ring seal which prevents external leakage, while 8 and 9 are sliding O-ring seals that prevent internal leakage. Item 14 is a backup ring supporting the sliding O-ring seals and preventing them from rolling.

I claim:

1. A flow control device for stopping the flow of a gas when there is a break in the flowpath downstream of said device comprising:
  a housing having a valve body comprising a first end and a second end;
  an inlet port located in said first end of said housing for admitting a gas to said housing;
  an outlet port located in said second end of said housing for discharging gas from said housing;
  a valve chamber located in said housing having a first end and a second end, said first end of said valve chamber in communication with said inlet port and said second end of said valve chamber in communication with said outlet port;
  a piston located for reciprocating movement in said valve chamber, said piston having an inlet side and an outlet side;
  a first orifice on said piston for restricting flow from said inlet side of said piston to said outlet side of said piston;
  a base located in said second end of said valve chamber for receiving a probe, said base having holes to allow gas to flow out through the outlet port wherein said probe has a threaded end and said base has an internal threaded bore for receiving said threaded end of said probe, such that said threaded probe can be adjusted toward or away from said piston; and
  a spring for biasing said piston away from said probe to allow the flow of a gas from the inlet end to the outlet end, when differential pressure across piston exceeds spring load, said piston comes into contact with said probe, restricting flow until upstream pressure is removed.

2. A flow control device for stopping the flow of a gas as in claim 1, wherein said spring serves to retain the probe base.

3. A flow control device for stopping the flow of a gas as in claim 1, further comprising a piston guide located in said first end of said valve chamber and parallel to the valve body.

4. A flow control device for stopping the flow of a gas as in claim 3, further comprising a second orifice leading to a cavity formed between said piston guide and said valve body.

5. A flow control device for stopping the flow of a gas as in claim 4, further comprising a wire inserted into said second orifice for reducing the opening of said second orifice.

6. A flow control device for stopping the flow of a gas when there is a break in the flowpath downstream of said device comprising:
  a housing having a valve body comprising a first end and a second end;
  an inlet port located in said first end of said housing for admitting a gas to said housing;
  an outlet port located in said second end of said housing for discharging gas from said housing;
  a valve chamber located in said housing having a first end and a second end, said first end of said valve chamber in communication with said inlet port and said second end of said valve chamber in communication with said outlet port;
  a piston located for reciprocating movement in said valve chamber, said piston having an inlet side and an outlet side;
  a piston guide fixed to said valve body and located in said first end of said valve chamber and parallel to the valve body, at least a portion of said piston located for reciprocal movement in said piston guide;
  a first orifice on said piston for restricting flow from said inlet side of said piston to said outlet side of said piston;
  a second orifice on said piston guide leading to a cavity formed between said piston guide and said valve body, said cavity communicating with said inlet port to provide a time delay to prevent premature closing of said valve during initial pressurization of the flowpath;

a base located in said second end of said valve chamber and including a probe, said base having holes to allow gas to flow out through the outlet port; and a spring for biasing said piston away from said probe to allow the flow of a gas from the inlet end to the outlet end, whereby when differential pressure across said piston exceeds spring load, said piston comes into contact with said probe, restricting flow until upstream pressure is removed.

7. The flow control device of claim 6 and further comprising a wire positioned in said second orifice.

8. The flow control device of claim 6 wherein a plurality of said flow control devices are connected to a respective plurality of riser lines and oxygen masks installed in an aircraft to provide auxiliary oxygen to passengers and crew during flight upon an incident resulting in cabin depressurization.

9. The flow control device of claim 8 wherein each of said flow control devices is capable of continuously allowing a maximum flow rate range of 56 lpm at 15,000 feet and 264 lpm at 40,000 feet without closing when there is no break in the respective riser line between the respective oxygen mask and the respective flow control device.

10. The flow control device of claim 9 wherein closing of one flow control device due to a break in its respective riser line will not affect the operability of the other flow control devices.

\* \* \* \* \*